(12) United States Patent
Vadon et al.

(10) Patent No.: US 8,271,521 B2
(45) Date of Patent: Sep. 18, 2012

(54) COMPUTERIZED SEARCH TECHNIQUE, SUCH AS AN INTERNET-BASED GEMSTONE SEARCH TECHNIQUE

(75) Inventors: Mark C. Vadon, Seattle, WA (US); Bridgette Hartley, Renton, WA (US); Aaron D. Miller, Seattle, WA (US); Scott Decker, Seattle, WA (US)

(73) Assignee: Blue Nile, Inc., Seattle, WA (US)

( * ) Notice: Subject to any disclaimer, the term of this patent is extended or adjusted under 35 U.S.C. 154(b) by 1004 days.

(21) Appl. No.: 11/508,943

(22) Filed: Aug. 24, 2006

(65) Prior Publication Data
US 2007/0219960 A1 Sep. 20, 2007

Related U.S. Application Data

(60) Provisional application No. 60/784,353, filed on Mar. 20, 2006.

(51) Int. Cl.
*G06F 7/00* (2006.01)
(52) U.S. Cl. ........................................... 707/770
(58) Field of Classification Search ............ 707/3
See application file for complete search history.

(56) References Cited

U.S. PATENT DOCUMENTS

| | | |
|---|---|---|
| 5,664,111 A | 9/1997 | Nahan et al. |
| 5,699,526 A | 12/1997 | Siefert |
| 5,758,257 A | 5/1998 | Herz et al. |
| 5,774,121 A | 6/1998 | Stiegler |
| 5,870,559 A | 2/1999 | Leshem et al. |
| 6,026,403 A | 2/2000 | Siefert |
| 6,070,169 A * | 5/2000 | Shorter .................. 707/103 R |
| 6,073,106 A | 6/2000 | Rozen et al. |
| 6,151,601 A | 11/2000 | Papierniak et al. |
| 6,169,997 B1 | 1/2001 | Papierniak et al. |
| 6,253,203 B1 | 6/2001 | O'Flaherty et al. |
| 6,334,110 B1 | 12/2001 | Walter et al. |
| 6,480,855 B1 | 11/2002 | Siefert |
| 6,519,600 B1 | 2/2003 | Siefert |
| 6,529,900 B1 | 3/2003 | Patterson et al. |
| 6,604,107 B1 * | 8/2003 | Wang .......................... 707/101 |
| 7,035,864 B1 * | 4/2006 | Ferrari et al. ................. 707/102 |
| 7,085,763 B2 * | 8/2006 | Ochiai et al. .................... 707/10 |
| 7,216,116 B1 | 5/2007 | Nilsson et al. |
| 7,299,247 B2 | 11/2007 | Calistri-Yeh et al. |
| 7,325,001 B2 | 1/2008 | Goldstein et al. |
| 7,325,201 B2 * | 1/2008 | Ferrari et al. ................. 715/737 |
| 7,337,166 B2 * | 2/2008 | Bailey et al. ...................... 707/3 |
| 7,428,528 B1 * | 9/2008 | Ferrari et al. ..................... 707/3 |
| 2002/0051020 A1 * | 5/2002 | Ferrari et al. ................. 345/854 |
| 2002/0065851 A1 | 5/2002 | Watson et al. |

(Continued)

OTHER PUBLICATIONS

M. Klee, "Flash Information Visualization = Great User Experiences," User Interface Engineering, www.flashmagazine.com, Aug. 24, 2001, 2 pages.

(Continued)

*Primary Examiner* — John E Breene
*Assistant Examiner* — Joshua Bullock
(74) *Attorney, Agent, or Firm* — Perkins Coie LLP

(57) ABSTRACT

Methods and systems for searching through databases of items are described. In some cases, the system presents a display of searched items. The system may present a customizable interface of displayed search results, where a range of values displayed may be customizable. Further, the displayed attributes of searched items may be customizable. Other search and display functions are also disclosed.

29 Claims, 24 Drawing Sheets

U.S. PATENT DOCUMENTS

| | | | |
|---|---|---|---|
| 2004/0030565 A1* | 2/2004 | Hendry, Jr. | 705/1 |
| 2004/0162765 A1* | 8/2004 | Reber | 705/26 |
| 2005/0071242 A1 | 3/2005 | Allen et al. | |
| 2005/0190264 A1 | 9/2005 | Neal | |
| 2005/0222993 A1* | 10/2005 | Ohtomo | 707/3 |
| 2005/0261989 A1 | 11/2005 | Vadon et al. | |
| 2006/0293932 A1* | 12/2006 | Cash et al. | 705/7 |
| 2006/0293979 A1* | 12/2006 | Cash et al. | 705/34 |
| 2007/0083505 A1* | 4/2007 | Ferrari et al. | 707/5 |
| 2007/0198494 A1 | 8/2007 | Vadon et al. | |
| 2007/0198501 A1* | 8/2007 | Sundaranatha | 707/4 |
| 2007/0219960 A1 | 9/2007 | Vadon et al. | |
| 2008/0015870 A1 | 1/2008 | Elowitz et al. | |

OTHER PUBLICATIONS

"adiamondisforever.com," Design Gallery, Aug. 1, 2003, 1 page, retrieved via archive.org Mar. 3, 2008.

"Diamond Search at Blue Nile," www.bluenile.com, retrieved via archive.org on Dec. 13, 2007, 2 pgs.

"Engagement Settings at Blue Nile," www.bluenile.com, retrieved via archive.org on Dec. 13, 2007, 2 pgs.

<www.bluenile.com>, dated Dec. 17, 2001, Retrieved via archive.org by applicant on Dec. 13, 2007 and submitted via IDS on Mar. 3, 2008. Further pages dated Nov. 22, 2001 retrieved via archive.org on Apr. 28, 2008 by the Examiner.

U.S. Appl. No. 11/483,414, Vadon et al.

* cited by examiner

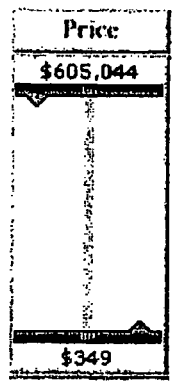
FIG. 3
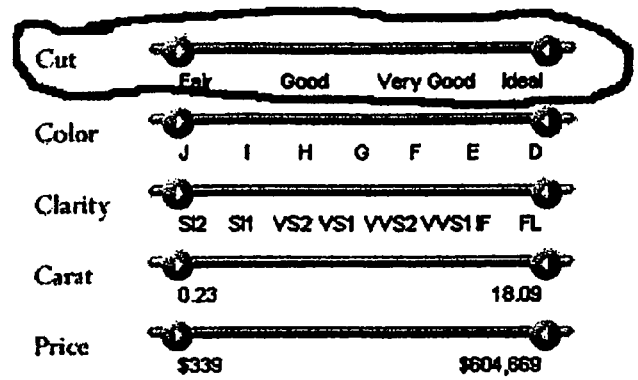
FIG. 5
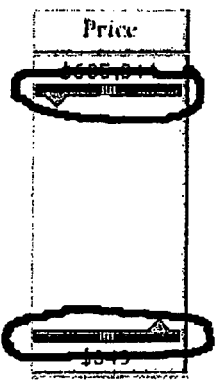
FIG. 4
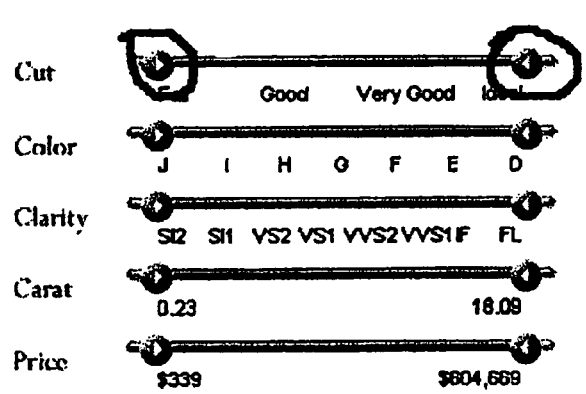
FIG. 6
FIG. 7A

| Price | Cut▸ | Color▸ | Clarity▸ | Carat▸ |
|---|---|---|---|---|
| 6 | | | | 18.09 |
| | Signature Ideal | D | FL | |
| | | E | IF | |
| | Ideal | F | VVS1 | |
| | | G | VVS2 | |
| | Very Good | H | VS1 | |
| | | | VS2 | |
| | Good | I | SI1 | |
| | Fair | J | SI2 | |
| $942 | | | | 0.23 |

FIG. 11

| Price | Cut▸ | Color▸ | Clarity▸ | Carat▸ |
|---|---|---|---|---|
| 6000 | | | | 18.09 |
| | Signature Ideal | D | FL | |
| | | E | IF | |
| | Ideal | F | VVS1 | |
| | | G | VVS2 | |
| | Very Good | H | VS1 | |
| | | | VS2 | |
| | Good | I | SI1 | |
| | Fair | J | SI2 | |
| $942 | | | | 0.23 |

FIG. 12

Round Diamonds — add/remove sliders

?? How to Narrow Your Search

Slide the bars up or down to narrow the range of diamonds listed below.

| Price | Cut▸ | Color▸ | Clarity▸ | Carat▸ |
|---|---|---|---|---|
| $605,044 | | | | 18.09 |
| | Signature Ideal | D | FL | |
| | | E | IF | |
| | Ideal | F | VVS1 | |
| | | G | VVS2 | |
| | Very Good | H | VS1 | |
| | | | VS2 | |
| | Good | I | SI1 | |
| | Fair | J | SI2 | |
| $349 | | | | 0.23 |

How to Narrow Your Search

| Price | Cut | Color | Clarity | Carat |
|---|---|---|---|---|
| $2,222,222 | Signature Ideal | D | FL | 12.87 |
| | Ideal | E | IF | |
| | Very Good | F | VVS1 | |
| | Good | G | VVS2 | |
| | Fair | H | VS1 | |
| | | I | VS2 | |
| | | J | SI1 | |
| $354 | | | SI2 | 0.23 |

◆ Close Advanced Search Options ◆

| Fluorescence | Polish | Symmetry | Depth% | Table% |
|---|---|---|---|---|
| ☑ None | Excellent | Excellent | 60.1-61.9 | 55-57 |
| ☑ Negligible/Faint | Very Good | Very Good | 60.1-62.8 | 53-57 |
| ☑ Strong | Good | Good | 58.5-64 | 52-60 |
| ☑ Very Strong | | | 57.5-64.5 | 51-67 |
| ☑ Faint Blue | | | <56.5->67 | <50->67 |
| ☑ Medium Blue | | | | |
| ☐ Strong Blue | | | | |

Add/Remove Search Result Columns

- ☑ Cut
- ☑ Color
- ☑ Clarity
- ☑ Carats
- ☑ Polish/Symmetry
- ☐ Length to Width Ratio
- ☐ Depth/Table
- ☐ Culet
- ☐ Fluorescence
- ☑ Report

*FIG. 16B*

| | Cut | Color | Clarity | Carat | Polish | Symmetry | Report | Price | |
|---|---|---|---|---|---|---|---|---|---|
| ☐ | Ideal | I | VS1 | 0.23 | ID/ID | | AGSL | $353 | |
| ☐ | Ideal | H | SI2 | 0.25 | ID/ID | | AGSL | $354 | |
| ☐ | Ideal | I | VS2 | 0.25 | ID/ID | | AGSL | $364 | |
| ☐ | Ideal | I | VS2 | 0.25 | ID/ID | | AGSL | $364 | |
| ☐ | Ideal | I | VS2 | 0.25 | ID/ID | | AGSL | $364 | |
| ☐ | Ideal | J | SI1 | 0.30 | ID/ID | | AGSL | $371 | |
| ☐ | Ideal | I | VS2 | 0.26 | ID/ID | | AGSL | $379 | |
| ☐ | Ideal | I | VS1 | 0.26 | VG/VG | | GIA | $379 | |
| ☐ | Ideal | I | VS1 | 0.26 | ID/ID | | AGSL | $379 | |
| ☐ | Ideal | I | VS1 | 0.26 | ID/ID | | AGSL | $379 | |
| ☐ | Ideal | I | VS1 | 0.26 | ID/ID | | AGSL | $379 | |
| ☐ | Ideal | I | VS1 | 0.26 | ID/ID | | AGSL | $379 | |
| ☐ | Good | H | SI1 | 0.23 | G/G | | GIA | $383 | |
| ☐ | Very Good | F | SI2 | 0.23 | G/G | | GIA | $383 | |
| ☐ | Very Good | I | VS1 | 0.25 | ID/ID | | AGSL | $383 | |
| ☐ | Ideal | I | VS1 | 0.26 | VG/VG | | GIA | $379 | |
| ☐ | Ideal | I | VS1 | 0.26 | ID/ID | | AGSL | $379 | |
| ☐ | Ideal | I | VS1 | 0.26 | ID/ID | | AGSL | $379 | |
| ☐ | Ideal | I | VS1 | 0.26 | ID/ID | | AGSL | $379 | |
| ☐ | Ideal | I | VS1 | 0.26 | ID/ID | | AGSL | $379 | |
| ☐ | Good | H | SI1 | 0.23 | G/G | | GIA | $383 | |
| ☐ | Very Good | F | SI2 | 0.23 | G/G | | GIA | $383 | |
| ☐ | Very Good | I | VS1 | 0.25 | ID/ID | | AGSL | $383 | |
| ☐ | Ideal | I | VS1 | 0.25 | ID/ID | | AGSL | $383 | |

FIG. 17

| Cut | Color | Clarity | Carat | Polish | Symmetry | Report | Price |
|---|---|---|---|---|---|---|---|
| Fair | F | VS1 | 0.24 | G | G | GIA | $349 |
| Ideal | H | SI1 | 0.23 | ID | ID | AGSL | $376 |
| Good | H | SI1 | 0.23 | G | G | GIA | $384 |
| Good | G | SI1 | 0.23 | VG | VG | GIA | $400 |
| Good | G | SI1 | 0.23 | VG | VG | GIA | $400 |
| Good | G | SI1 | 0.23 | VG | VG | GIA | $400 |
| Good | F | SI1 | 0.23 | G | G | GIA | $400 |
| Good | F | SI1 | 0.23 | EX | G | GIA | $400 |
| Good | E | SI1 | 0.23 | G | VG | GIA | $400 |
| Good | E | SI1 | 0.23 | VG | VG | GIA | $400 |
| Very Good | G | SI1 | 0.23 | VG | G | GIA | $400 |
| Very Good | G | SI1 | 0.23 | VG | G | GIA | $400 |
| Very Good | G | SI1 | 0.23 | EX | G | GIA | $400 |
| Very Good | F | SI1 | 0.23 | G | G | GIA | $400 |
| Good | D | SI2 | 0.24 | G | VG | GIA | $401 |
| Good | G | VS2 | 0.23 | VG | G | GIA | $415 |

FIG. 18

| Cut | Color | Clarity | Carat | Polish | Symmetry | Report | Price |
|---|---|---|---|---|---|---|---|
| Fair | F | VS1 | 0.24 | G | G | GIA | $349 |
| Ideal | H | SI1 | 0.23 | ID | ID | AGSL | $376 |
| Good | H | SI1 | 0.23 | G | G | GIA | $384 |
| Good | G | SI1 | 0.23 | VG | VG | GIA | $400 |
| Good | G | SI1 | 0.23 | VG | VG | GIA | $400 |
| Good | G | SI1 | 0.23 | VG | VG | GIA | $400 |
| Good | F | SI1 | 0.23 | G | G | GIA | $400 |
| Good | F | SI1 | 0.23 | EX | G | GIA | $400 |
| Good | E | SI1 | 0.23 | G | VG | GIA | $400 |
| Good | E | SI1 | 0.23 | VG | VG | GIA | $400 |
| Very Good | G | SI1 | 0.23 | VG | G | GIA | $400 |
| Very Good | G | SI1 | 0.23 | VG | G | GIA | $400 |
| Very Good | G | SI1 | 0.23 | EX | G | GIA | $400 |
| Very Good | F | SI1 | 0.23 | G | G | GIA | $400 |
| Good | D | SI2 | 0.24 | G | VG | GIA | $401 |
| Good | G | VS2 | 0.23 | VG | G | GIA | $415 |

*FIG. 19*

| Cut | Color | Clarity | Carat | Polish | Symmetry | Report | Price |
|---|---|---|---|---|---|---|---|
| Fair | F | VS1 | 0.24 | G | G | GIA | $349 |
| Ideal | H | SI1 | 0.23 | ID | ID | AGSL | $376 |
| Good | H | SI1 | 0.23 | G | G | GIA | $384 |
| Good | G | SI1 | 0.23 | VG | VG | GIA | $400 |
| Good | G | SI1 | 0.23 | VG | VG | GIA | $400 |
| Good | G | SI1 | 0.23 | VG | VG | GIA | $400 |
| Good | F | SI1 | 0.23 | G | G | GIA | $400 |
| Good | F | SI1 | 0.23 | EX | G | GIA | $400 |
| Good | E | SI1 | 0.23 | G | VG | GIA | $400 |
| Good | E | SI1 | 0.23 | VG | VG | GIA | $400 |
| Very Good | G | SI1 | 0.23 | VG | G | GIA | $400 |
| Very Good | G | SI1 | 0.23 | VG | G | GIA | $400 |
| Very Good | G | SI1 | 0.23 | EX | G | GIA | $400 |
| Very Good | F | SI1 | 0.23 | G | G | GIA | $400 |
| Good | D | SI2 | 0.24 | G | VG | GIA | $401 |
| Good | G | VS2 | 0.23 | VG | G | GIA | $415 |

*FIG. 20*

| Cut | Color | Clarity | Carat | Polish | Symmetry | Report | Price | Diamond Details |
|---|---|---|---|---|---|---|---|---|
| Fair | F | VS1 | 0.24 | G | G | GIA | $349 | View |
| Ideal | H | SI1 | 0.23 | ID | ID | AGSL | $376 | View |
| Good | H | SI1 | 0.23 | G | G | GIA | $384 | View |
| Good | G | SI1 | 0.23 | VG | VG | GIA | $400 | View |
| Good | G | SI1 | 0.23 | VG | VG | GIA | $400 | View |
| Good | G | SI1 | 0.23 | VG | VG | GIA | $400 | View |
| Good | F | SI1 | 0.23 | G | G | GIA | $400 | View |
| Good | F | SI1 | 0.23 | EX | G | GIA | $400 | View |
| Good | E | SI1 | 0.23 | G | VG | GIA | $400 | View |
| Good | E | SI1 | 0.23 | VG | VG | GIA | $400 | View |
| Very Good | G | SI1 | 0.23 | VG | G | GIA | $400 | View |
| Very Good | G | SI1 | 0.23 | VG | G | GIA | $400 | View |
| Very Good | G | SI1 | 0.23 | EX | G | GIA | $400 | View |
| Very Good | F | SI1 | 0.23 | G | G | GIA | $400 | View |
| Good | D | SI2 | 0.24 | G | VG | GIA | $401 | View |
| Good | G | VS2 | 0.23 | VG | G | GIA | $415 | View |

FIG. 21

| Cut | Color | Clarity | Carat | Polish | Symmetry | Report | Price | Diamond Details |
|---|---|---|---|---|---|---|---|---|
| Fair | F | VS1 | 0.24 | G | G | | | |
| Ideal | H | SI1 | 0.23 | ID | ID | | | |
| Good | H | SI1 | 0.23 | G | G | | | |
| Good | G | SI1 | 0.23 | VG | VG | | | |
| Good | G | SI1 | 0.23 | VG | VG | | | |
| Good | G | SI1 | 0.23 | VG | VG | | | |
| Good | F | SI1 | 0.23 | G | G | | | |
| Good | F | SI1 | 0.23 | EX | G | | | |
| Good | E | SI1 | 0.23 | G | VG | | | |
| Good | E | SI1 | 0.23 | VG | VG | GIA | $400 | View |
| Very Good | G | SI1 | 0.23 | VG | G | GIA | $400 | View |
| Very Good | G | SI1 | 0.23 | VG | G | GIA | $400 | View |
| Very Good | G | SI1 | 0.23 | EX | G | GIA | $400 | View |
| Very Good | F | SI1 | 0.23 | G | G | GIA | $400 | View |
| Good | D | SI2 | 0.24 | G | VG | GIA | $401 | View |
| Good | G | VS2 | 0.23 | VG | G | GIA | $415 | View |

Show:
- ☑ Cut  ☑ Report
- ☑ Color  ☐ Depth %
- ☑ Clarity  ☐ Table %
- ☑ Carat  ☐ Culet
- ☑ Polish  ☐ Fluorescence
- ☑  ☐ Length to Update Preferences

FIG. 22

| Cut | Color | Clarity | Carat | Polish | Symmetry | | | |
|---|---|---|---|---|---|---|---|---|
| Fair | F | VS1 | 0.24 | G | G | | | |
| Ideal | H | SI1 | 0.23 | ID | ID | | | |
| Good | H | SI1 | 0.23 | G | G | | | |
| Good | G | SI1 | 0.23 | VG | VG | | | |
| Good | G | SI1 | 0.23 | VG | VG | | | |
| Good | G | SI1 | 0.23 | VG | VG | | | |
| Good | F | SI1 | 0.23 | G | G | | | |
| Good | F | SI1 | 0.23 | EX | G | | | |
| Good | E | SI1 | 0.23 | G | VG | | | |
| Good | E | SI1 | 0.23 | VG | VG | GIA | $400 | view |
| Very Good | G | SI1 | 0.23 | VG | G | GIA | $400 | view |
| Very Good | G | SI1 | 0.23 | VG | G | GIA | $400 | view |
| Very Good | G | SI1 | 0.23 | EX | G | GIA | $400 | view |
| Very Good | F | SI1 | 0.23 | G | G | GIA | $400 | view |
| Good | D | SI2 | 0.24 | G | VG | GIA | $401 | view |
| Good | G | VS2 | 0.23 | VG | G | GIA | $415 | view |

*FIG. 23*

| Color | Clarity | Carat | Polish | Symmetry | Report | Price | Diamond Details |
|---|---|---|---|---|---|---|---|
| F | VS1 | 0.24 | G | G | GIA | $349 | view |
| H | SI1 | 0.23 | ID | ID | AGSL | $376 | view |
| H | SI1 | 0.23 | G | G | GIA | $384 | view |
| G | SI1 | 0.23 | VG | VG | GIA | $400 | view |
| G | SI1 | 0.23 | VG | VG | GIA | $400 | view |
| G | SI1 | 0.23 | VG | VG | GIA | $400 | view |
| F | SI1 | 0.23 | G | G | GIA | $400 | view |
| F | SI1 | 0.23 | EX | G | GIA | $400 | view |
| E | SI1 | 0.23 | G | VG | GIA | $400 | view |
| E | SI1 | 0.23 | VG | VG | GIA | $400 | view |
| G | SI1 | 0.23 | VG | G | GIA | $400 | view |
| G | SI1 | 0.23 | VG | G | GIA | $400 | view |
| G | SI1 | 0.23 | EX | G | GIA | $400 | view |
| F | SI1 | 0.23 | G | G | GIA | $400 | view |
| D | SI2 | 0.24 | G | VG | GIA | $401 | view |
| G | VS2 | 0.23 | VG | G | GIA | $415 | view |

*FIG. 24*

| Color | Clarity | Carat | Polish | Symmetry | Report | Price |
|---|---|---|---|---|---|---|
| F | VS1 | 0.24 | G | G | GIA | |
| H | SI1 | 0.23 | ID | ID | AGSL | |
| H | SI1 | 0.23 | G | G | GIA | |
| G | SI1 | 0.23 | VG | VG | GIA | |
| G | SI1 | 0.23 | VG | VG | GIA | |
| G | SI1 | 0.23 | VG | VG | GIA | |
| F | SI1 | 0.23 | G | G | GIA | |
| F | SI1 | 0.23 | EX | G | GIA | |
| E | SI1 | 0.23 | G | VG | GIA | |
| E | SI1 | 0.23 | VG | VG | GIA | $400 |
| G | SI1 | 0.23 | VG | G | GIA | $400 |
| G | SI1 | 0.23 | VG | G | GIA | $400 |
| G | SI1 | 0.23 | EX | G | GIA | $400 |
| F | SI1 | 0.23 | G | G | GIA | $400 |
| D | SI2 | 0.24 | G | VG | GIA | $401 |
| G | VS2 | 0.23 | VG | G | GIA | $415 |

*FIG. 25*

| Color | Clarity | Carat | Polish | Symmetry | Report | Price |
|---|---|---|---|---|---|---|
| F | VS1 | 0.24 | G | G | GIA | |
| H | SI1 | 0.23 | ID | ID | AGSL | |
| H | SI1 | 0.23 | G | G | GIA | |
| G | SI1 | 0.23 | VG | VG | GIA | |
| G | SI1 | 0.23 | VG | VG | GIA | |
| G | SI1 | 0.23 | VG | VG | GIA | |
| F | SI1 | 0.23 | G | G | GIA | |
| F | SI1 | 0.23 | EX | G | GIA | |
| E | SI1 | 0.23 | G | VG | GIA | |
| E | SI1 | 0.23 | VG | VG | GIA | $400 |
| G | SI1 | 0.23 | VG | G | GIA | $400 |
| G | SI1 | 0.23 | VG | G | GIA | $400 |
| G | SI1 | 0.23 | EX | G | GIA | $400 |
| F | SI1 | 0.23 | G | G | GIA | $400 |
| D | SI2 | 0.24 | G | VG | GIA | $401 |
| G | VS2 | 0.23 | VG | G | GIA | $415 |

*FIG. 26*

| Color | Clarity | Carat | Polish | Symmetry | Report | Fluorescence | Price | Diamond Details |
|---|---|---|---|---|---|---|---|---|
| F | VS1 | 0.24 | G | G | GIA | None | $349 | |
| H | SI1 | 0.23 | ID | ID | AGSL | None | $376 | |
| H | SI1 | 0.23 | G | G | GIA | None | $384 | |
| G | SI1 | 0.23 | VG | VG | GIA | None | $400 | |
| G | SI1 | 0.23 | VG | VG | GIA | None | $400 | |
| G | SI1 | 0.23 | VG | VG | GIA | None | $400 | |
| F | SI1 | 0.23 | G | G | GIA | Faint | $400 | |
| F | SI1 | 0.23 | EX | G | GIA | None | $400 | |
| E | SI1 | 0.23 | G | VG | GIA | Medium Blue | $400 | |
| E | SI1 | 0.23 | VG | VG | GIA | None | $400 | |
| G | SI1 | 0.23 | VG | G | GIA | Medium | $400 | |
| G | SI1 | 0.23 | VG | G | GIA | None | $400 | |
| G | SI1 | 0.23 | EX | G | GIA | None | $400 | |
| F | SI1 | 0.23 | G | G | GIA | None | $400 | |
| D | SI2 | 0.24 | G | VG | GIA | Faint | $401 | |
| G | VS2 | 0.23 | VG | G | GIA | None | $415 | |

*FIG. 27A*

Guide
• Learn About Diamonds

| Cut | Color | Clarity | Carat | Polish | Symmetry | Report | Price | Diamond Details |
|---|---|---|---|---|---|---|---|---|
| Fair | F | VS1 | 0.24 | G | G | GIA | $338 | |
| Good | G | VS1 | 0.23 | VG | G | GIA | $340 | |
| Ideal | I | VS2 | 0.25 | ID | ID | AGSL | $349 | |
| Ideal | H | VS1 | 0.23 | EX | VG | GIA | $353 | |
| Very Good | E | SI1 | 0.23 | VG | VG | GIA | $359 | |
| Very Good | D | SI1 | 0.23 | EX | G | GIA | $359 | |
| Very Good | G | VS1 | 0.25 | G | G | GIA | $361 | |
| Very Good | G | VS1 | 0.25 | G | G | GIA | $361 | |
| Very Good | E | SI1 | 0.24 | VG | VG | GIA | $362 | |
| Ideal | I | VS2 | 0.26 | ID | ID | AGSL | $363 | |
| Ideal | I | VS1 | 0.26 | VG | VG | GIA | $363 | |
| Ideal | I | VS1 | 0.26 | ID | ID | AGSL | $363 | |
| Ideal | I | VS1 | 0.26 | ID | ID | AGSL | $363 | |
| Ideal | I | VS1 | 0.26 | ID | ID | AGSL | $363 | |
| Ideal | I | VS1 | 0.26 | ID | ID | AGSL | $363 | |
| Good | H | SI1 | 0.23 | G | G | GIA | $367 | |

| Cut | Color | Clarity | Carat | Polish | Symmetry | Report | Price |
|---|---|---|---|---|---|---|---|
| Fair | F | VS1 | 0.24 | G | G | GIA | $338 |
| Good | G | VS1 | 0.23 | VG | G | GIA | $340 |
| Ideal | I | VS2 | 0.25 | ID | ID | AGSL | $348 |
| Ideal | H | VS1 | 0.23 | EX | VG | GIA | $353 |
| Very Good | | | | | | GIA | |
| Very Good | D | SI1 | 0.23 | EX | G | GIA | $358 |
| Very Good | G | VS1 | 0.25 | G | G | GIA | $361 |
| Very Good | G | VS1 | 0.25 | G | G | GIA | $361 |
| Very Good | E | SI1 | 0.24 | VG | VG | GIA | $362 |
| Ideal | I | VS2 | 0.26 | ID | ID | AGSL | $363 |
| Ideal | I | VS1 | 0.26 | VG | VG | GIA | $363 |
| Ideal | I | VS1 | 0.26 | ID | ID | AGSL | $363 |
| Ideal | I | VS1 | 0.26 | ID | ID | AGSL | $363 |
| Ideal | I | VS1 | 0.26 | ID | ID | AGSL | $363 |
| Ideal | I | VS1 | 0.26 | ID | ID | AGSL | $363 |
| Good | H | SI1 | 0.23 | G | G | GIA | $367 |

Learn About Diamonds

Shipping Information:
Order by:
3 PM ET tomorrow
Receive loose:
Monday, March 20
Set in Jewelry:
Thursday, March 23

Diamond Information:
Stock Number:
LD00390877
Depth %: 62.3%
Table %: 58%
Girdle: Medium
Culet: None
Fluorescence: Faint Blue
Measurements:
3.92x3.95x2.45 mm

FIG. 30

Show:
☑ Cut     ☑ Report
☑ Color   ☐ Depth %
☑ Clarity ☐ Table %
☑ Carat   ☐ Culet
☑ Polish  ☑ Fluorescence
☐ Symmetry Update Preferences

| | Your Search Results: 27,878 Diamonds | | | | | | add/remove columns | |
|---|---|---|---|---|---|---|---|---|
| | Cut | Color | Clarity | Carat | Polish | Report | Fluorescence | Price | Diamond Details |
| | Fair | F | VS1 | 0.24 | G | GIA | None | $338 | |
| | Good | G | VS1 | 0.23 | VG | GIA | None | $340 | |
| | Ideal | I | VS2 | 0.25 | ID | AGSL | None | $349 | |
| | Ideal | H | VS1 | 0.23 | EX | GIA | None | $353 | |
| | Very Good | D | SI1 | 0.23 | EX | GIA | None | $359 | |
| | Very Good | G | VS1 | 0.25 | G | GIA | None | $361 | |
| | Very Good | G | VS1 | 0.25 | G | GIA | None | $361 | |
| | Very Good | E | SI1 | 0.24 | VG | GIA | None | $362 | |
| | Ideal | I | VS2 | 0.26 | ID | AGSL | None | $363 | |
| | Ideal | I | VS1 | 0.26 | VG | GIA | None | $363 | |
| | Ideal | I | VS1 | 0.26 | ID | AGSL | None | $363 | |
| | Ideal | I | VS1 | 0.26 | ID | AGSL | None | $363 | |
| | Ideal | I | VS1 | 0.26 | ID | AGSL | None | $363 | |
| | Ideal | I | VS1 | 0.26 | ID | AGSL | None | $363 | |
| | Good | H | SI1 | 0.23 | G | GIA | None | $367 | |

• Learn About Diamonds

Shipping Information:
Order by:
3 PM ET tomorrow
Receive loose:
Monday, March 20
Set in Jewelry:
Thursday, March 23

Diamond Information:
Stock Number:
LD00390877
Depth %: 62.3%
Table %: 58%
Girdle: Medium
Symmetry: Very Good
Culet: None
Measurements:
3.92x3.95x2.45 mm

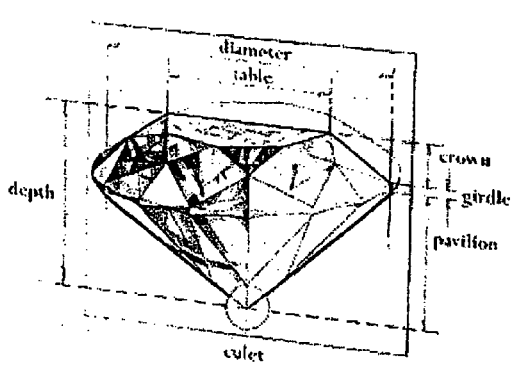

Culet: The facet at the tip of The preferred culet is not vis unaided eye (graded "none"

Depth: The height of a gem measured from the culet to t

Place your cursor over a part of the diamond to highlight the definition.

Polish & Symmetry Affect Sparkle

Polish and symmetry are two important aspects of the cutting process. The polish grade describes the smoothness of the diamond's facets, and the symmetry grade refers to alignment of the facets. With poor polish, the surface of a facet can be dulled, and may create blurred or dulled sparkle. With poor symmetry, light can be misdirected as it enters and exits the diamond. The polish and symmetry grades are clearly listed in each diamond detail page and within the GIA or AGSL diamond grading report. For the most beautiful diamond, look l grade of excellent (EX), very good (VG), or good (G) for a GIA graded diamond, and ic excellent (EX), very good (VG), or good (G) for an AGSL graded diamond. Avoid diam symmetry grades of fair (F) or poor (P), as the alignment of their facets may misdirect l severely that it affects the brilliance of the diamond.

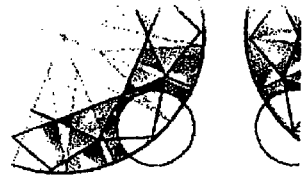

Diamond measurements are calculated and applied to a cut grading scale that makes understand how well each reflect light:

- Blue Nile Signature Ideal cut: Represents roughly the top 1% of diamond quality cut. The highest grades of polish and symmetry allow it to reflect even more light t standard ideal cut. Our most brilliant cut.
- Ideal cut: Represents roughly the top 3% of diamond quality based on cut. Reflec light that enters the diamond. An exquisite and rare cut.
- Very good cut: Represents roughly the top 15% of diamond quality based on cut nearly as much light as the ideal cut, but for a lower price.
- Good cut: Represents roughly the top 25% of diamond quality based on cut. Refl light that enters. Much less expensive than a very good cut.
- Fair cut: Represents roughly the top 35% of diamond quality based on cut. Still a diamond, but a fair cut will not be as brilliant as a good cut.
- Poor cut: This includes all diamonds that do not meet the performance standards These diamonds are generally deep and narrow or shallow and wide and tend to l the light out the sides and bottom. Blue Nile does not carry diamonds with cut gra Questions? Contact service@bluenile.com or 888-565-7641

For phone orders, please mention: 8PMWH8

Blue Nile Diamond Cut

FIG 34B

Blue Nile carries the largest selection of certified ideal-cut diamonds. We do not carry ( cut grades lower than fair, which are generally either too shallow or too deep to preser acceptable amount of brilliance.

Which Cut Grade is Best?
- For a diamond with the best cut, that will look exceptional even when viewed under look to the Blue Nile Signature Collection. These diamonds reflect the most brillianc they are cut to the most exacting proportions. They have the highest polish and syrr available for round diamonds, and our signature fancy shapes have either excellent polish and symmetry grades.
- For the best value in a brilliant diamond, choose a diamond with a cut grade of gooc and polish and symmetry grades of very good or good.
- If your diamond has an ideal- or very-good cut with very good or good polish and sy may want to consider less expensive grades of color and clarity — look for a diamor color and SI1 or SI2 clarity.

More About Cut

How Does Blue Nile Grade Diamond Cut?
Both the GIA and AGSL use numerous criteria to grade diamond cut. When a GIA or grade is not available, Blue Nile provides a cut grade that allows you to compare diar consistent criteria. Learn how we determine cut grade.

▸ Diamonds  ▸ Cut  ▸ Color  ▸ Clarity  ▸ Carat Weight  ▸ Certification  ▸ Care Receive special offers and gift ideas from Blue Nile: [Enter your e-mail]  [ent About Us    Contact Us    Free FedEx®    30-Day Returns    Financing & Insurance    Refer a Friend

 Blue Nile Canada     Blue Nile United Kingdom

Site Map Legal Notices Privacy Policy (updated) © 1999-2006, Blue Nile, Inc.

| Website | 3/17/2006 4:16:17 PM |
|---------|----------------------|
| Database | 3/17/2006 4:16:16 PM |

FIG 34C

COMPUTERIZED SEARCH TECHNIQUE, SUCH AS AN INTERNET-BASED GEMSTONE SEARCH TECHNIQUE

CROSS REFERENCE TO RELATED APPLICATION(S)

This application claims priority to U.S. Provisional Patent Application No. 60/784,353, filed Mar. 20, 2006, entitled COMPUTERIZED SEARCH TECHNIQUE, SUCH AS AN INTERNET-BASED GEMSTONE SEARCH TECHNIQUE.

BACKGROUND

Consumers of items, such as gemstones, used cars, art, and so on, typically desire certain items that have specific attributes desirable to the consumer. For example, one consumer may wish to buy a gemstone having a high fluorescence attribute, while another does not care about fluorescence.

Many of these types of items have a seemingly unlimited number of possible combinations of attributes. These unlimited combinations of attributes cause providers of these items to present the items in large inventories or databases, in order to provide many desirable options to consumers.

Online searching for items allows consumers to electronically (such as, over the internet) search through databases of items. However, providing an interface or display of all the items in a large database while allowing a user to search and sort the items based on item attributes would be cumbersome and inefficient. Therefore, an interface providing easy sorting and searching of items would have desirable utility.

BRIEF DESCRIPTION OF THE DRAWINGS

FIG. 3 is an example of a user interface component.

FIG. 4 is an example of how the system uses the user interface component of FIG. 3.

FIG. 5 is an example of another user interface component.

FIG. 6 is an example of how the system uses the user interface component of FIG. 5.

FIG. 7A is an example of an alternative or additional user interface component to that of FIGS. 3 and 5.

Figures 8, 9, 10:
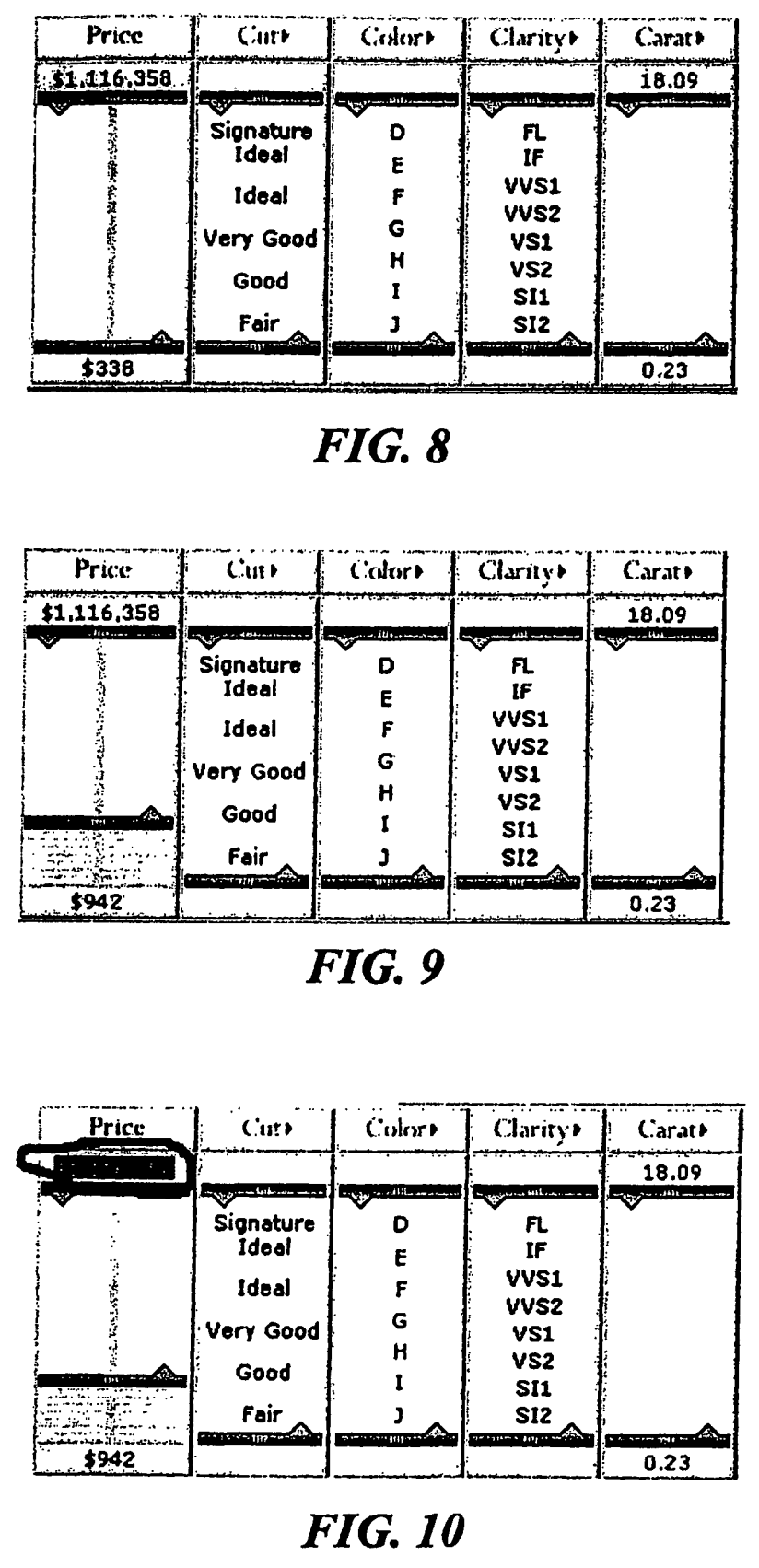

FIG. 8 is an example of another user interface component.

FIG. 9 is an example of the user interface component of FIG. 8 in an altered configuration.

FIG. 10 is an example of the user interface component of FIG. 8 in an altered configuration.

FIG. 11 is an example of the user interface component of FIG. 8 in an altered configuration.

FIG. 12 is an example of the user interface component of FIG. 8 in an altered configuration.

FIG. 13 is an example of a user interface component and an interface customization component.

FIG. 14 is an example of a user interface component and an interface customization component.

FIG. 15 is an example of the components of FIG. 13 and/or 14 in an altered configuration.

FIGS. 16A-16B are examples of the components of FIG. 13 and/or 14 in an altered configuration.

FIG. 17 is an example of an alternate display of the user interface components of FIGS. 13 and/or 14.

FIG. 18 is an example of a display interface.

FIG. 19 is an example of a row of the display interface of FIG. 18.

FIG. 20 is an example of a column of the display interface of FIG. 18.

FIG. 21 is an example of a customizable display interface before customization.

FIG. 22 is an example of the customizable display interface of FIG. 21 and a user interface component.

FIG. 23 is an example of the customizable display interface and the user interface component in an altered configuration.

FIG. 24 is an example of the customizable display interface of FIG. 21 after customization.

FIG. 25 is an example of the customizable display interface of FIG. 21 and a user interface component.

FIG. 26 is an example of the customizable display interface of FIG. 21 and a selection of a column in the user interface component.

FIG. 27A is an example of the customizable display interface of FIG. 21 after customization.

FIG. 28 is an example of an initial state of a customizable display interface.

FIG. 29 is an example of the customizable display interface of FIG. 28 showing additional information.

FIG. 30 is an example of the customizable display interface of FIG. 28 and a user interface component.

FIG. 31 is an example of a customized display interface.

FIGS. 32A-32B are examples of alternative customized display interfaces.

FIG. 33 is an example of a display interface showing help information.

FIGS. 34A-34C are examples of display interfaces displaying help and/or education information.

Note: the headings provided herein are for convenience and do not necessarily affect the scope or interpretation of the invention.

A portion of this disclosure contains material to which a claim for copyright is made. The copyright owner has no objection to the facsimile reproduction by anyone of the patent document or patent disclosure (including the Figures) as it appears in the Patent and Trademark Office patent file or records, but the copyright owner reserves all other copyright rights whatsoever.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention.

Certain terms may even be emphasized below; however, any terminology intended to be interpreted in any restricted manner will be overtly and specifically defined as such in this Detailed Description section.

Figure 1:
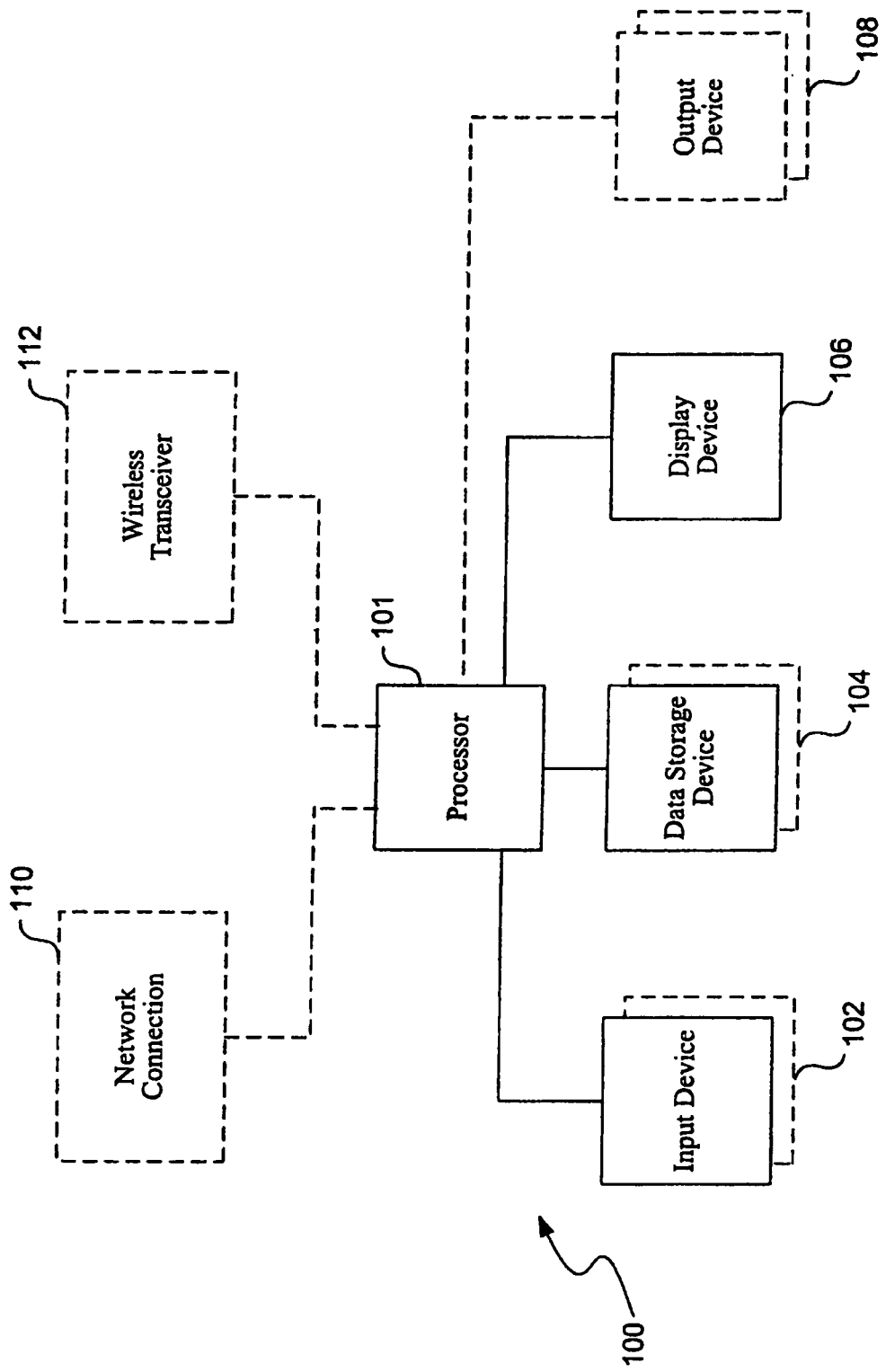
FIG. 1 is a block diagram of a basic and suitable computer that may employ aspects of the invention.

FIG. 1 and the following discussion provide a brief, general description of a suitable computing environment in which aspects of the invention can be implemented. Although not required, aspects and embodiments of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to FIG. 1, one embodiment of the invention employs a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 1).

Figure 2A:
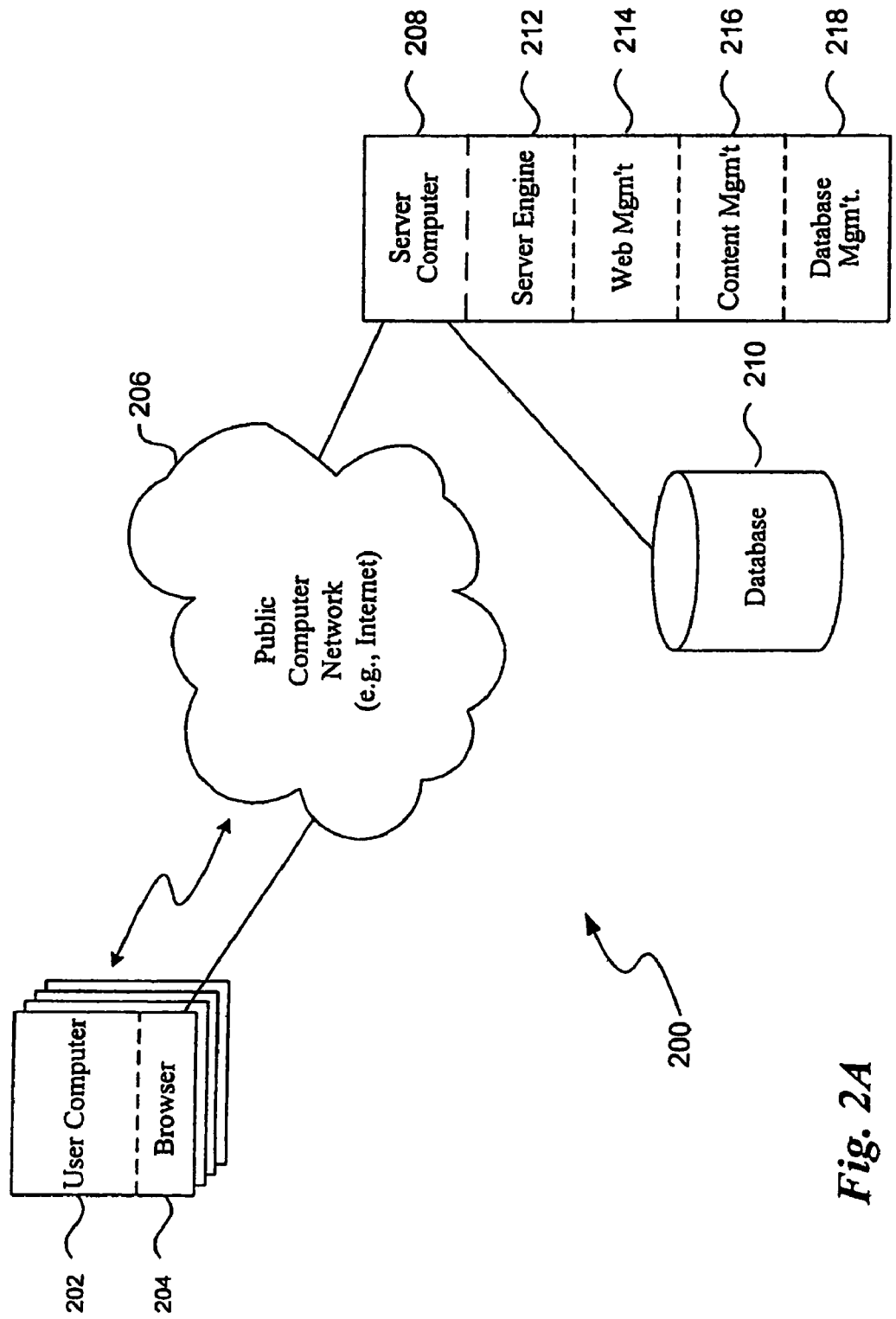
FIG. 2A is a block diagram illustrating a simple, yet suitable system in which aspects of the invention may operate in a networked computer environment.

Aspects of the invention may be practiced in a variety of other computing environments. For example, referring to FIG. 2A, a distributed computing environment with a web interface includes one or more user computers 202 in a system 200 are shown, each of which includes a browser program module 204 that permits the computer to access and exchange data with the Internet 206, including web sites within the World Wide Web portion of the Internet. The user computers may be substantially similar to the computer described above with respect to FIG. 1. User computers may include other program modules such as an operating system, one or more application programs (e.g., word processing or spread sheet applications), and the like. The computers may be general-purpose devices that can be programmed to run various types of applications, or they may be single-purpose devices optimized or limited to a particular function or class of functions. More importantly, while shown with web browsers, any application program for providing a graphical user interface to users may be employed, as described in detail below; the use of a web browser and web interface are only used as a familiar example here.

At least one server computer 208, coupled to the Internet or World Wide Web ("Web") 206, performs much or all of the functions for receiving, routing and storing of electronic messages, such as web pages, audio signals, and electronic images. While the Internet is shown, a private network, such as an intranet may indeed be preferred in some applications. The network may have a client-server architecture, in which a computer is dedicated to serving other client computers, or it may have other architectures such as a peer-to-peer, in which one or more computers serve simultaneously as servers and clients. A database 210 or databases, coupled to the server computer(s), stores much of the web pages and content exchanged between the user computers. The server computer(s), including the database(s), may employ security measures to inhibit malicious attacks on the system, and to preserve integrity of the messages and data stored therein (e.g., firewall systems, secure socket layers (SSL), password protection schemes, encryption, and the like).

The server computer 208 may include a server engine 212, a web page management component 214, a content management component 216 and a database management component 218. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data such as video, graphics and audio signals and storage of data such as textual data, video, graphics and audio signals.

Figure 2B:
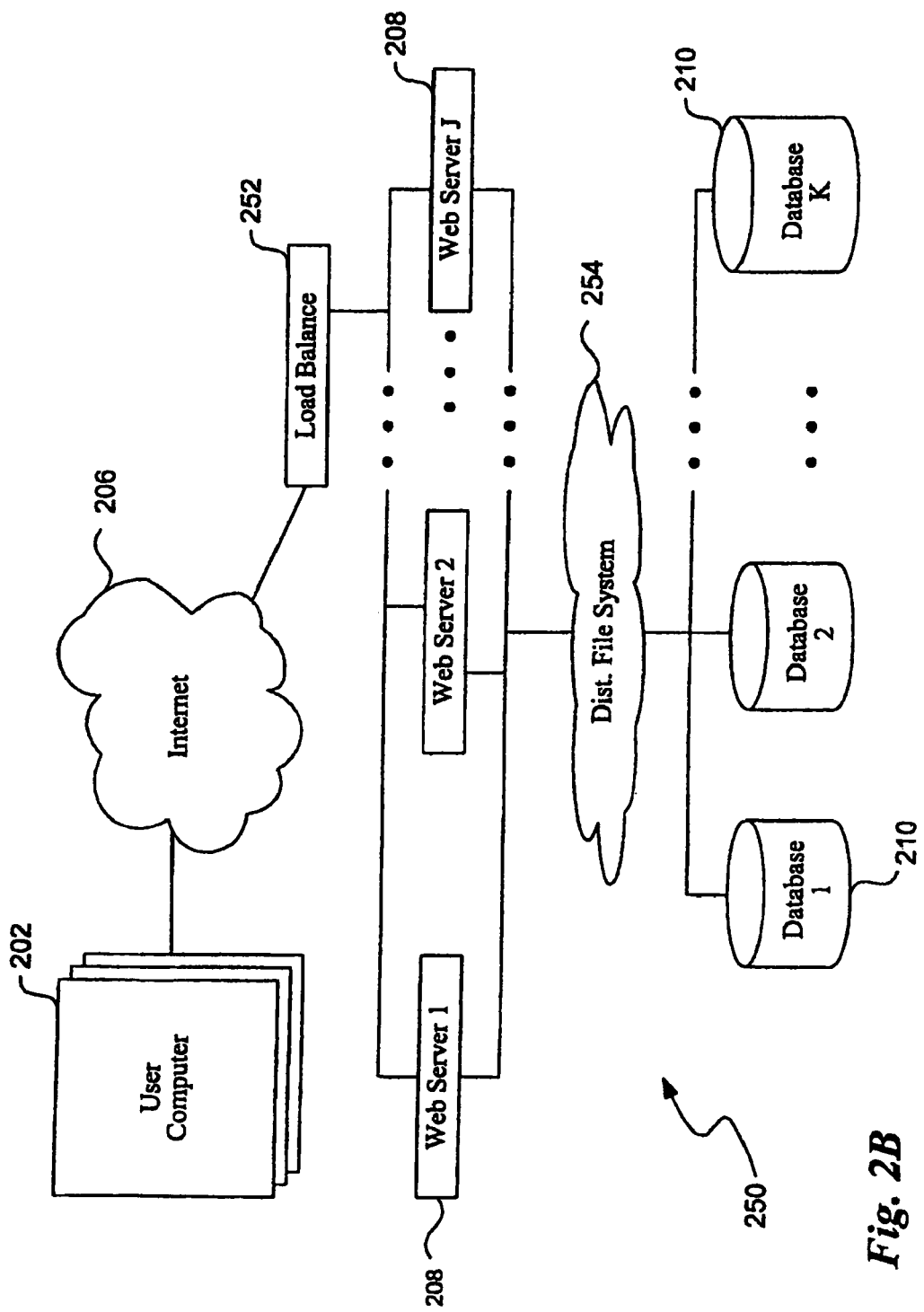
FIG. 2B is a block diagram illustrating an alternative system to that of FIG. 2A.

Referring to FIG. 2B, an alternative embodiment to the system 200 is shown as a system 250. The system 250 is substantially similar to the system 200, but includes more than one server computer (shown as server computers 1, 2, . . . J). A load balancing system 252 balances load on the several server computers. Load balancing is a technique well-known in the art for distributing the processing load between two or more computers, to thereby more efficiently process instructions and route data. Such a load balancer can distribute message traffic, particularly during peak traffic times.

A distributed file system 254 couples the web servers to one or more databases (shown as databases 1, 2 . . . K). A distributed file system is a type of file system in which the file system itself manages and transparently locates pieces of information (e.g., content pages) from remote files or databases and distributed files across the network, such as a LAN. The distributed file system also manages read and write functions to the databases.

Search Software Application

Described in detail below is a software application for providing search customization. The software application may be used to search through a large inventory or database of items, such as gemstones, used cars, art, as well as other less unique items, such as consumer electronics, clothing/shoes, etc. Several embodiments of the invention are shown in FIGS. 3 through 34, with respect to customizing a gemstone search interface. Customization of a search criteria interface and gemstone attribute display interface can be broken out into at least two separate aspects, both of which are described below.

Overall, aspects of the invention have the ability to provide more or less detail to a user, to customize display of data, among other features. For gemstones, additional characteristics beyond standard ones (e.g., cut, size, color, clarity, shape, and price) may be provided by accessing a menu and selecting desired characteristics (e.g., depth percentage, table percentage, polish, length-to-width ratio, symmetry, florescence, etc.). Further, standard characteristics may also be suppressed or excluded in a search. Additional details in a detail report can be provided with respect to a given item returned in a search, as well as easily accessible help screens that describe various characteristics. For example, details may be provided regarding what the characteristic "symmetry" refers to, and detail can be provided by zooming into a GIA report.

Initial Request and Load

The browser initially sends a request to the server for a diamond search application. (While the term "diamond" is often used herein, the interface may apply to the searching of any gemstone.) The server responds with content and code that contains the client representation of the diamond search application. This application processes any configuration information necessary to determine initial search criteria. The criteria may indicate that the search should be restricted to round diamonds available in the US, to all diamonds available at a desired date, and so on. Any possible search criteria may be used as initial criteria. Some or all of the initial criteria may be modifiable by the end user. An example of non-modifiable criteria is "for sale on this website" as that is implicit in the context of the search. An example of initial criteria that may be modifiable is gemstone shape.

The criteria may be passed in any format that provides enough information for the server to understand what to search for. The server interprets the request and then initiates a request for the diamond information. Such information may reside on the same server computer or another server. During this time the diamond application may choose to display a visual indicator that informs the user that the request for diamond information is in process. The diamond information is then sent to the client computer, along with any necessary supporting information such as total diamond count, where the information is rendered in such a way that the user can then view the diamond information.

1) Alternatively the first set of data could have been returned as a result of the initial request.
2) Instead of passing all the search criteria with each request, some or all of the request criteria may be stored on a server computer.
3) Instead of passing all the search criteria with each request, some or all of the request criteria may be stored in a cookie.

Overall Search Criteria Interface

The search criteria interface consists of those portions of the application and user interface that allow the user to choose gemstone attributes, ranges of gemstone attributes, or in any other way make a choice that affects the criteria used to constrain the set of gemstones found in the search. The set of gemstones found in the search and the changes to the set of gemstones found in the search may be displayed via a count of diamonds, a list of diamonds, or any combination of these or other methods. Other methods may include subjective restrictions or groupings such as "highest quality diamonds only" or an indication of what the diamond may be set in—such as a yellow gold ring. The search criteria interface may also be made up of individual search criteria components.

Search Criteria User Interface Component

Referring to the following Figures, representative computer displays or web pages will now be described with respect to searching, presenting results, etc. These screens may be implemented in a variety of ways. The screens or web pages provide facilities to receive input data, such as fields to be filled in, pull-down menus or entries allowing one or more of several options to be selected, buttons, sliders, check boxes, hypertext links or other known user interface tools for receiving user input. While certain ways of displaying information to users, or receiving input from users, is shown and described with respect to certain Figures, those skilled in the relevant art will recognize that various other alternatives may be employed. The terms "screen," "web page" and "page" are generally used interchangeably herein.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

A search criteria user interface component consists of, at a minimum, an indicator of what criteria is to be refined and a method by which the user may indicate a criteria value, set of values, or range of values. One example of a criterion is price. An example of how a criterion could be set is through the use of a mouse or keyboard to manipulate a component of the interface. Another way a criteria could be set is to enter textual or numeric information into an entry area.

In one implementation a search criteria user interface component may appear as shown in FIG. 3. In this example the component is being used to constrain price, the horizontal bars as shown in FIG. 4 can be moved by the user to indicate to what extent the gemstone search should be constrained. In this case the horizontal bars shown circled in FIG. 4 can be moved by the user to indicate to what extent the gemstone search should be constrained.

In another implementation the search criteria user interface component may appear as in FIG. 5. In this case the user indicates or adjusts the price constraint by moving the round element with the triangle inside it, as shown circled in FIG. 6.

In another implementation the search criteria user interface component may appear as shown in FIG. 7A. In this case the user indicates or adjusts the price constraint by entering specific prices.

In some cases, the search criteria user interface component may have two distinct boundary values or sets of boundary values. The outer boundary values are those values that constrain the range of a refinement user interface control to a limited range that may be equal to or less than the range of the entire data set to be searched. The inner boundary values are those values that are used to define the search criteria itself. By definition, the inner boundary values must lie within the outer boundary values such that min (inner values)>=min (outer values) and max (inner values)<=max (outer values). This allows the user to set outer boundary values to less than the boundaries of the entire data set, providing controls with a greater sensitivity. The inner boundaries may be controlled by the positions of the control elements and the outer boundaries may be controlled by initial settings and/or enterable text boxes. The system may also permit a user to reset the outer boundary values to match the range of the entire data set.

Figure 7B:
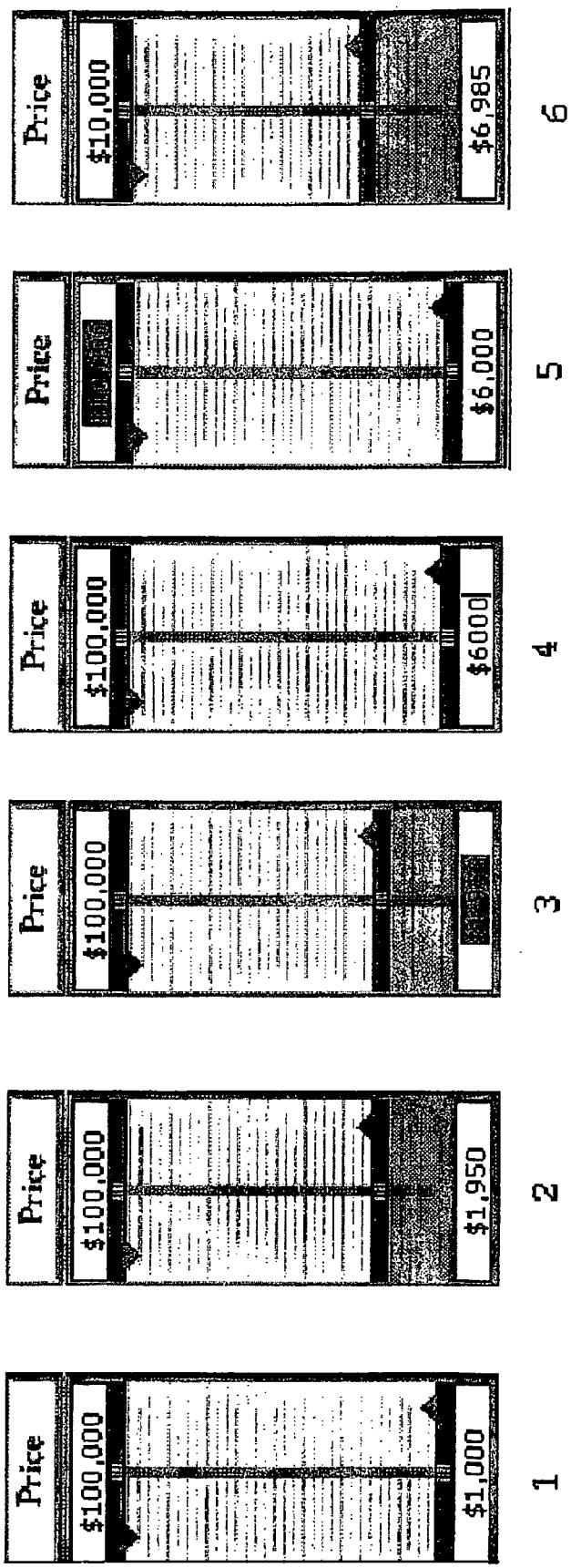
FIG. 7B is an example of user interface components having user adjusted boundary values.

Referring to FIG. 7B, an example of a user display component showing boundary values of price at different stages of configuration is shown. The same user interface component for displaying outer bounds may also be used for resetting both inner and outer bounds. A first use is to display an attribute value represented by a position of a corresponding upper or lower bound control element or slider. A second use is to allow the outer and inner boundaries to be set by replacing the value that is currently being displayed.

FIG. 7B shows an example of adjusting a user display component or price slider in steps "1" through "6". In this example, a user has entered a search for initial price bounds of $1,000 to $100,000. Step 1 shows the initial user display component. In step 2, a user moves a lower bound sliding bar upwards and the user display component reflects a user desired minimum bound value of $1,950. In steps 3 and 4, the user selects the lower bound value and adjusts the lower bound value to $6,000. The user display component reflects the user adjustment of the lower bound value from $1,950 to $6,000, with the lower bound sliding bar corresponding to a value of $6,000. In step 5, the user selects the upper bound value and adjusts the upper bound value to $10,000. The user display component reflects the user adjustment of the upper bound value from $100,000 to $10,000, with the upper bound sliding bar corresponding to a value of $10,000. Thus, Step 5 reflects the adjustments in Steps 2-4 to the refinement control of the user display component. The sliding bar is now set to a lower bound value of $6,000 and an upper bound value of $10,000. In this example, an incremental adjustment of the sliding bar (such as sliding the bar up in the display), shown in step 6, will change the desired value more slowly and more sensitively than in the originally displayed component of step 1. In these examples, the system uses the same controls to display the bound values and to adjust the values. The user interface component may have at least two uses, (1) to display the attributes values represented by the position of the corresponding upper or lower bound control element, and (2) to set the upper or lower bound values by replacing the displayed values.

In other words, the above methods may be combined to allow both the entering of specific constraint information as well as the use of movable interface elements. Another example of combining the entering of text with the use of other interface components is shown in the Figures. In step 1 (FIG. 8) an initial state is shown. In step 2 (FIG. 9) the mouse or keyboard is used to increase the minimum price constraint to $942. In step 3 (FIG. 10) the price area is activated by placing the cursor into the area, or selecting the text or otherwise indicating that the area should be activated through the use of the keyboard or other methods. As the user enters the price the constraint may react immediately as in FIG. 11. Finally as the user finishes entering the price the constraint is set to the number entered as in FIG. 12. Alternatively the system may adjust the constraint while the user is entering it or after to a different value.

As an addition to any method described above there may be additional user interface components that set or adjust the values of the constraint user interface components. An example of this would be a "reset" button that sets all the constraints back to their initial values.

Choosing Refinement Method

An aspect of the search application is that it allows the end-user to customize the user interface in a number of ways. The client interface may present the user with a set of customization options or may allow the user to choose which customizations are available.

In one scenario this could mean that the search application presents the ability to add and/or remove search criteria user interface components. A refinement user interface component is used to indicate to the search component what criteria should be applied to identify a set of gemstones. Note that the refinement criteria may or may not correspond simply to criteria applying to a single gemstone attribute.

Search Criteria Customization Interface

The search criteria customization interface is the area of the user interface that is used to initiate the customization actions for the gemstone search criteria interface. This interface may be visible always or only under certain circumstances or based on user action.

In one implementation specifically for diamonds, the initial diamond attributes that are candidates for simple search criteria are price, shape, cut grade (cut), color grade (color), clarity grade (clarity), carat weight (carat), depth percent, table percent, crown angle percent, crown height percent, pavilion angle, pavilion depth, star length, lower half percent, length, width, height, length/width ratio, finish, polish, symmetry, fluorescence, girdle description, girdle quality, min girdle size, max girdle size, girdle facet, culet, certificate lab(s), certificate id, comments from certificate, certification type, other comments, existence of scanned certificate, availability set or loose, arrival date set or loose, ship date set or loose, time listed on site, crown, pavilion, compatibility with jewelry for mounting purposes, branding information, user or other favorites, user or other ranking, user or other rating, popularity of users, visibility of hearts and arrows, existence of or contents of inscription, location of inclusions or flaws, ability to reflect light, and ratios or relationships of any of the attributes. In addition to the basic diamond attributes listed above an additional attribute that can be used is a user flag wherein the user can select gemstones or sets of gemstones to flag with additional attributes that are predefined or defined by the user. One example of that would be the "favorite" or "remember" attribute where individual diamonds or sets of diamonds can be tagged and retrieved.

Search Criteria Customization Example

FIG. 13 presents an example interface where a button labeled "add/remove sliders" is part of the customization interface.

When the button is activated by the user of the keyboard, mouse, or other means, the user is presented with a set of choices that can be made about which attributes can be used to refine a search. In this example in FIG. 14, Cut, Color, Depth %, Clarity, Table %, Carat, Polish, Symmetry, Length to Width Ratio, and Fluorescence are the attributes for which a search criteria user interface component can be added or removed.

An attribute refinement area can be hidden/removed by a user action. In this example in FIG. 15, the "Cut" checkbox has been unchecked and the "Polish" checkbox has been checked.

Figures 14, 15, 16A:
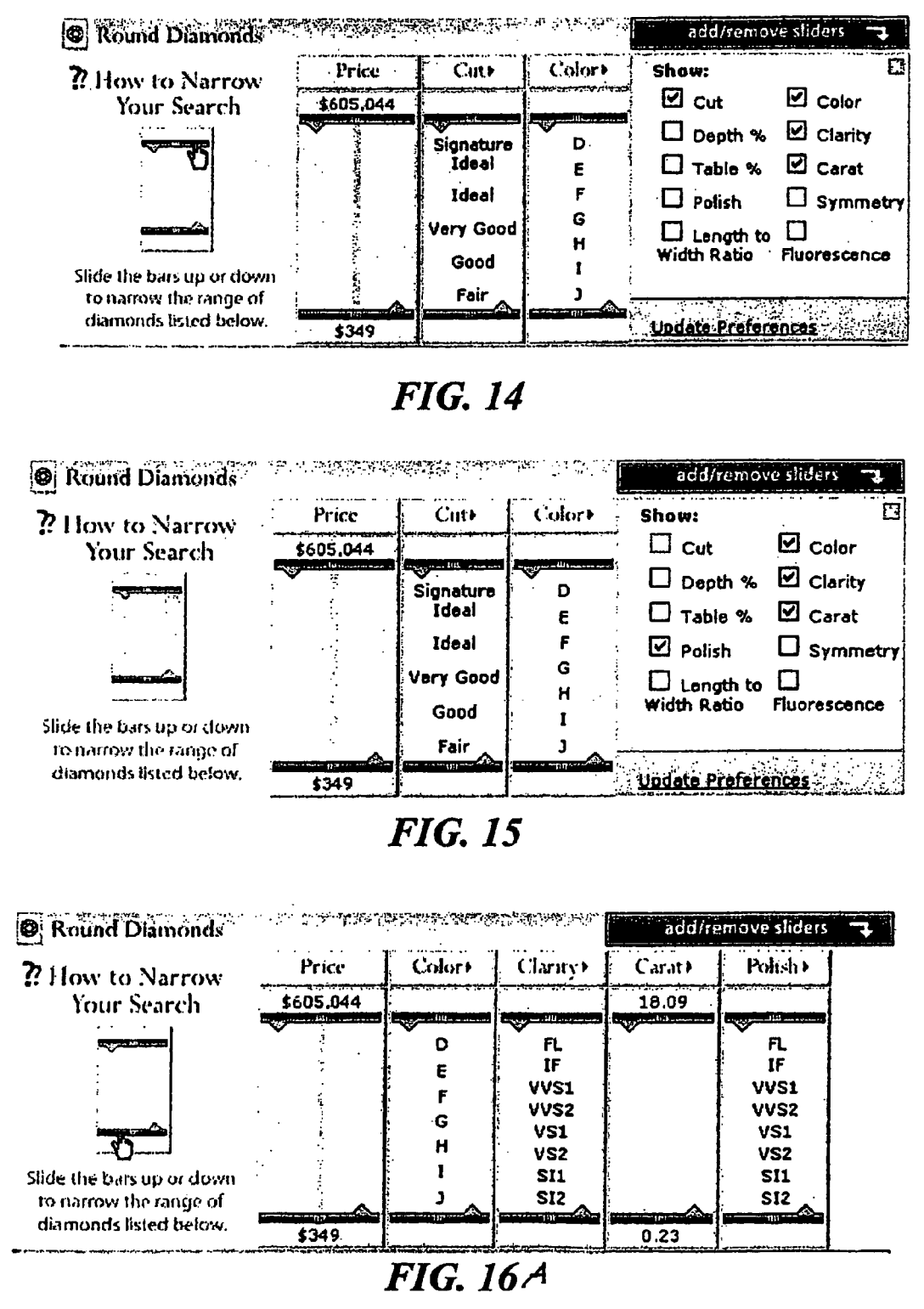

Either immediately, or after the user has indicated that the selection process has been completed, the user interface updates with the results of the user action as shown in FIG. 16A. The result is that the Cut criteria component is no longer visible and the Polish criteria component is visible.

In another implementation, such as the example shown in FIG. 16B, the interface could always show a list of components than can be selectively added or removed. (The term "removed" can include any of removed, hidden, shrunk, or moved out of the way, while the term "Added" means to make usable, show, expand, or otherwise make more usable.)

In another implementation each search criteria user interface component could have an area or button which when activated would cause the component to be removed.

In another implementation the interface could present icons or other representations of the search criteria user interface components. These icons could be dragged using the mouse pointer or other means into the search area where they would cause a search component to appear. To remove search criteria user interface components the component could be dragged or otherwise caused to be moved out of the primary search area. This action would result in the component being removed from the primary search area.

In another implementation there may be preconfigured sets of search criteria interface components. An example of this would be to include "basic, typical, expert" settings wherein the basic action would result in fewest search criteria user interface components being visible In another implementation the criteria components could appear in a different form and/or a different position.

In another implementation the criteria components may be expanded and reduced rather than hidden and shown. In this example the buttons marked with a + or − on the far left will expand or contract the criteria component. When the criteria component is expanded more of it becomes visible. An example of this is shown in FIG. 17.

Gemstone Display Interface

The display interface consists of those portions of the application and user interface that allow the user to view information about specific gemstones or sets of gemstone characteristics. This interface may display each gemstone independently or may aggregate diamonds with similar characteristics.

One example of a display interface locates each gemstone in a horizontal row and aligns each characteristic vertically in a column.

In this example (FIG. 18) there are 16 diamonds shown, each with 8 attributes: cut, color, clarity, carat, polish, symmetry, report, and price. Each attribute is displayed as text in a column but there are many other ways this could be done—for example by using a graphical indicator or simply by creating a text description that is not aligned into columns. An example of a row is shown in FIG. 19, while an example of a column is shown in FIG. 20.

Gemstone Attribute User Interface Components

A gemstone attribute user interface component may be a simple text or graphical representation of a gemstone attribute or set of attributes. This component allows the end user to view specific attributes for specific gemstones or sets of gemstones. A display attribute user interface component tends to encompass a specific attribute across all gemstones in the display. In FIG. 20 a gemstone attribute display component would be comprised of an entire column of information such as "color".

Display Interface Customization

In some aspects of the search application, gemstone attributes may be hidden or shown dynamically based on the user request. In one scenario this could mean that the search application presents the ability to add and/or remove display attribute user interface components. Note that the display attribute components may or may not correspond simply to a single gemstone attribute.

In one implementation the display attribute user interface components could move or be caused to move to a separate area of the screen. They may appear with the same size and content or in a different state, as a graphical icon for example. The component could be able to be moved back into the primary display area in reaction to a request from the user or the system.

In one implementation the display attribute user interface components may simply become smaller and may not show any attribute information in the smaller state. The component would stay roughly in the same location and could be able to be expanded in reaction to a request from the user or the system.

Display Customization Interface

The display customization interface is the part of the interface that is used to initiate the customization actions. This interface may be visible always or only under certain circumstances or based on user action.

FIG. 21 presents an example interface before customization.

In the example of FIG. 22, when the "add/remove columns" button is activated the user is presented with a set of choices regarding which display attribute user interface components to include. (Alternatively, the user may choose an order of components, directly manipulate components, or the customization interface may already be visible.

In this example (FIG. 22) when the "add/remove columns" button is activated, the user is presented with a set of choices regarding which display attribute user interface components to include.

In the example of FIG. 23, the "Cut" checkbox is first de-selected. When the "Update Preferences" link activated, the cut display attribute user interface component is no longer shown as shown in FIG. 24.

In the next example of FIGS. 25 and 26, the "Fluorescence" checkbox is selected. In this implementation, after the "Update Preferences" link is activated, the Fluorescence display attribute user interface component is now shown (FIG. 27A).

In one implementation, the auto customizing additional user interface component would appear visibly along with the attribute display user interface and would not necessarily be hidden and shown. Its contents would change in response to user or system request to show information from different gemstones. The display attributes that it contains (such as polish and symmetry) would change in response to changes in the attribute display interface.

Auto-Customizing Additional Information User Interface Component

The auto-customizing additional information user interface component is a part of the user interface that shows additional information about a gemstone. While there may be information that is duplicated, this component changes the information it displays (customizes its interface) in reaction to other parts of the user interface, application configuration, or application state information.

Figure 27B:
FIG. 27B is an example of the customized display interface of FIG. 27A and an information display interface.

An example of the additional information appearing within the gemstone interface may be seen in FIG. 27B. In one implementation the additional information component is displayed (added/shown) in the user interface based on a user action, as an overlay on top of search results. This user action may be moving the cursor (mouse pointer indicator) over the gemstone display interface. Other methods such as the use of a key or other user input device could be used to trigger the display of additional information. Alternatively the system could automatically select the initial gemstone to display additional information for. In this example the information appears to the left of the gemstone display interface—in practice the information may appear on top of the gemstone display interface, or within the gemstone display interface itself by shifting or obscuring existing data or filling in a blank area.

In the example of FIG. 28, the initial state does not show any additional information. When the cursor is placed over the gemstone display interface the additional information is shown (FIG. 29). FIG. 30 shows an example of a screen display after adding fluorescence and removing symmetry. The additional information component now displays symmetry and no longer displays fluorescence (FIG. 31).

Figure 32:
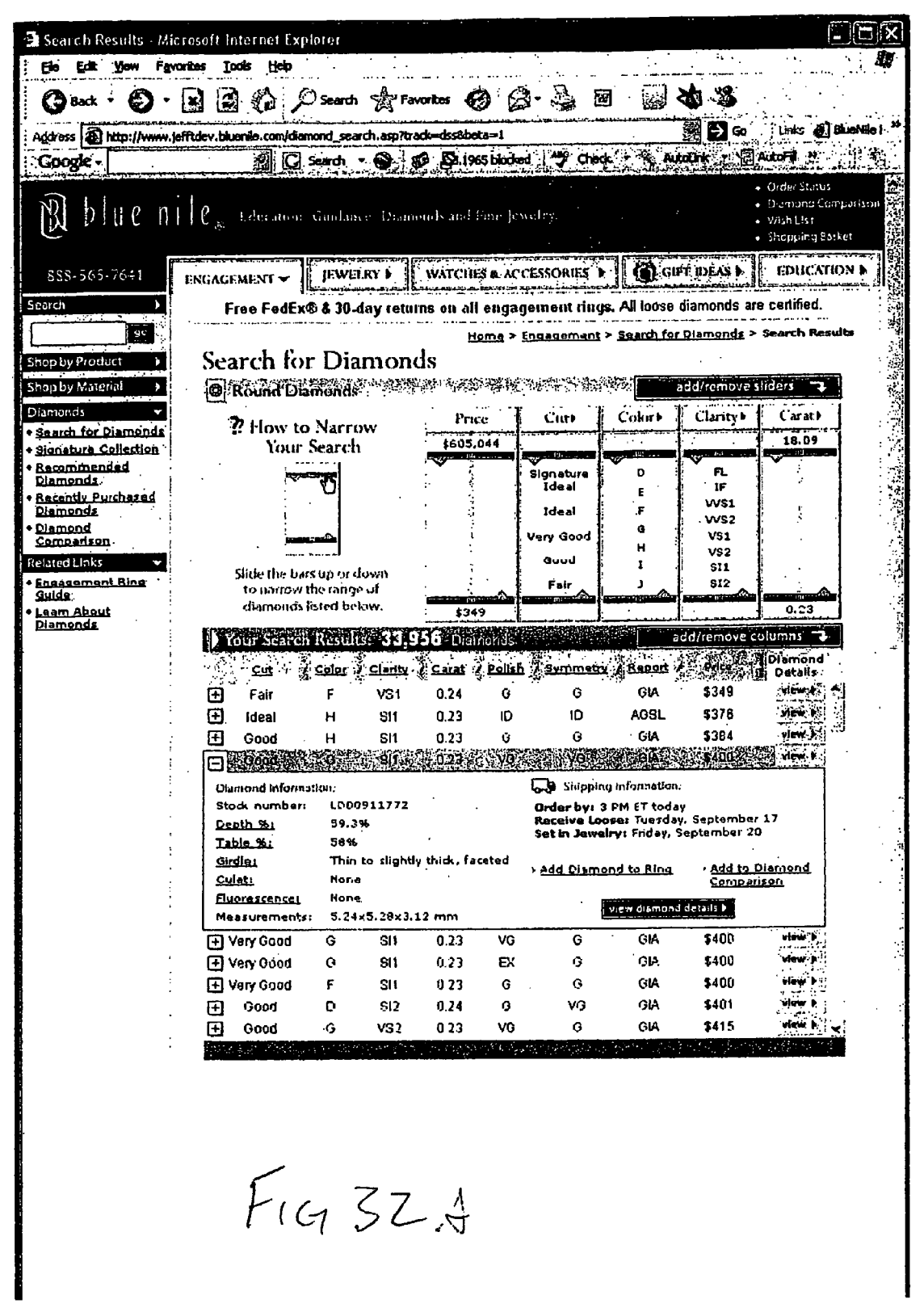
Figure 32B:
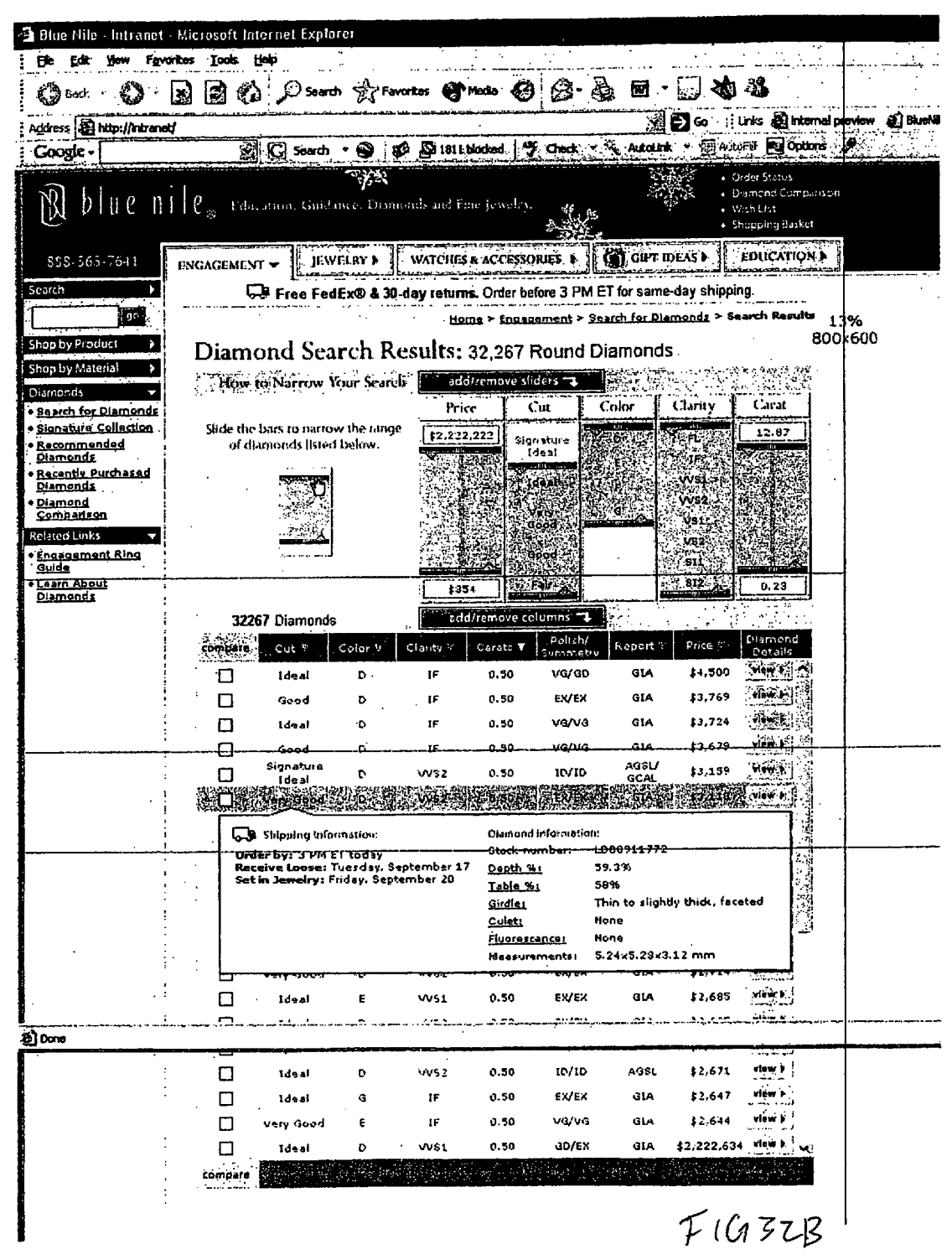

In another implementation the additional information may appear within the gemstone display interface itself. An example of this is shown in FIG. 32A, where the detail information may be displayed by clicking one of the "+" shown with respect to a stone listed in a given row (which turns to a "−" to display some detail information as shown for one stone). Further detail information, such as an GIA Certificate, enlarged digital photograph, etc. may be shown by clicking a "view diamond details" link. Another example, similar to that shown in FIG. 29, is shown in FIG. 32B.

This addition information component functionality may be able to be turned on and off via some user interface component or other input method.

Figure 33:
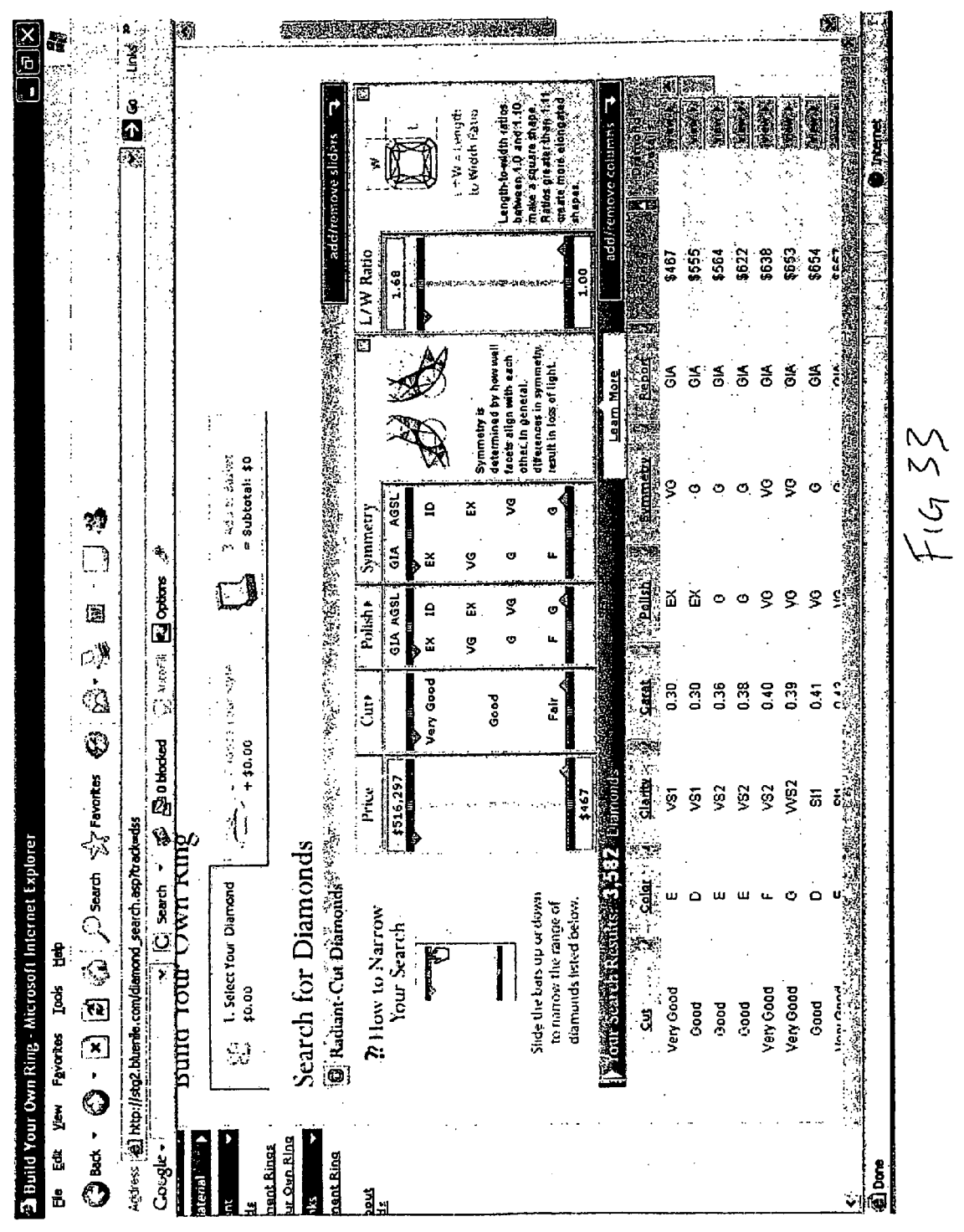
Figure 34A:
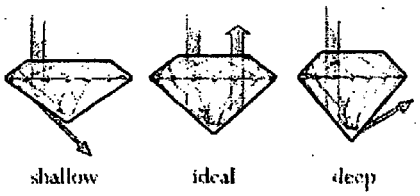

The system may also provide help or education to users. As shown in FIG. 33, by selecting a header over each vertical slider, an area that displays of education or description of that criterion may be shown. For example, both "Symmetry" and length-to-width ratio ("L/W Ratio") criteria have been selected and boxes displayed to the right which describe these criteria. By selecting a "Learn More" link, the system may display further details regarding these criteria, as shown in FIGS. 34A through 34C. By clicking on the, for example, Learn More link of the Symmetry description, the system may jump to the section "Polish & Symmetry Affect Sparkle" shown in FIG. 34B. Thus, the user can readily access helpful information without having to navigate through numerous screens.

Alternatives

Various alternatives or additions to the features described above may be provided. For example, the interface may provide a suggestion of settings that may be used with a selected diamond. The user could choose a setting first, and then the system may show diamonds appropriate for that setting.

Other criteria that could be shown beyond those noted above could be a linear scale or slider bar for calculated values, such as price per carat, value suggestions, or other algorithmically generated values.

The interface could provide displays of settings based on metal type or color to thereby search through and sort settings for appropriate gemstones. The system could remember previous settings or configurations so that if the user deselects or hides one display attribute user interface component, but then displays it again, it will be adjusted to the setting previously established by the user. Alternatively, the system can prompt the user to restore settings or configurations. The system may update some settings based on other changes, such as changes in the shape of a diamond. The system may automatically update search results when the user suppresses or hides a previously displayed interface component (which would typically increase the number of search results). Further, the system may display an optional reset button to reset all user interface components to a default configuration.

The system may detect window sizing of a user's computer, and reconfigure the user interface based on the detected window size. Further, the system may include a maximize button that would show as many options as would fit on a detected window size.

Users may select a subset of returned results. For example, users may select or check boxes for given diamonds displayed (e.g., boxes in a left-hand column shown in FIG. 32B) and click a "compare" button to display only those selected diamonds. Thus, the user can click on certain diamonds to keep them, or alternatively, click on those diamonds to be removed from display. Alternatively, the user could drag and drop select diamonds into a "safe" or other displayed location to generate a set of favorites for later review.

This system may provide features to help users identify two or more matched gemstones. Alternatively, rather than displaying diamonds based on price, or even displaying any results, the system may first allow the user to adjust various criteria and then initiate a search for gemstones meeting those criteria.

Gemstones may be filtered based on other criteria, such as arrival date, eligibility to fit in different types of items (e.g., to fit within a three-stone ring), etc. The system further may provide groupings of similar shapes so that, for example, all rectangular cuts may be grouped together (e.g., all rectilinear shapes grouped together like princess, emerald, asscher, radiant and cushion cuts). Thus, preselected groups of shapes may be searched together.

Conclusion

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The teachings of the invention provided herein can be applied to other systems, not necessarily the system described herein. For example, while the various embodiments are described above with respect to a gemstone search interface, those embodiments may be implemented for searching one or more databases storing unique data such as on used cars, art, as well as other less unique items, such as consumer electronics, clothing/shoes, etc. The elements and acts of the various embodiments described herein can be combined to provide further embodiments.

Any patents, applications and other references, including any that may be listed in accompanying filing papers, are incorporated herein by reference, including U.S. patent application Ser. Nos. 10/452,789 and 11/109,159, filed May 30, 2003 and Apr. 6, 2005, respectively, both entitled "Apparatus and Method for Facilitating a Search for Gemstones," and Application No. 60/697,673, filed Jul. 8, 2005, entitled "Apparatus and Method for Facilitating a Search for Sets of Gems." Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for displaying results of a user-initiated search of a database of gemstones, the system comprising:
    a search component for permitting user-initiated search of a database of gemstones, wherein each gemstone is characterized by multiple attributes, and wherein the user-initiated search includes user-selection of a value of at least one of the multiple attributes;
    a results component that displays to the user a list of gemstones provided by the user-initiated search, wherein the list of gemstones includes the display of values of at least two attributes associated with each gemstone in the list, wherein the results component includes at least a remove attribute interface control that permits user-removal of one of the attributes displayed in the list of gemstones; and
    a display component that provides, in response to a user command, a display of additional information associated with at least one gemstone, wherein the additional information includes the one removed attribute when that one attribute is not displayed in the list of gemstones.

2. The system of claim 1, wherein the display component includes a control to turn on or off the display of additional information.

3. The system of claim 1, wherein the display of additional information appears as a display element over at least a portion of the list of gemstones.

4. A method to display results of searching of a database of multiple unique or rare items for purchase by way of a user computer connected to a public computer network, wherein the multiple items are all within a predetermined category, the method comprising:
    permitting user-initiated search of a database of unique or rare items, wherein each unique or rare item is characterized by multiple attributes, and wherein the user-initiated search includes user-selection of a value of at least one of the multiple attributes;
    presenting to the user a list of unique or rare items provided by the user-initiated search, wherein the list of unique or rare items includes the presentation of values of at least two attributes associated with each unique or rare item in the list,
    wherein the presenting includes at least an add attribute interface control that permits user-addition of an additional attribute to the presented list of unique or rare items; and
    providing, in response to user input, a display of additional information associated with at least one unique or rare item, wherein the additional information does not include the additional attribute when that additional attribute is displayed in the list of unique or rare items.

5. The method of claim 4, wherein the unique or rare items are gemstones, and wherein the display of additional information appears as a display element over at least a portion of the list of gemstones.

6. The method of claim 4, further comprising providing a reset button to set the presentation of the list of unique or rare items back to an initial presentation.

7. A method of displaying unique or rare items within a category by way of a computer connected to a network to allow the items to be purchased, the method comprising:
    displaying a set of attributes to a user and a control that allows the user to select or deselect one or more of the set of attributes, the set of attributes derived from a database of multiple unique or rare items in a category, wherein each item in the database is characterized by values of one or more of the attributes;
    receiving a first user input selecting or deselecting at least one of the displayed set of attributes;
    displaying a range of data values associated with at least one of the displayed set of attributes and a control to allow a user to specify a desired range of values for the displayed attribute;

receiving a second user input specifying the desired range of values for the displayed attribute;

searching the database to identify unique or rare items that satisfy the desired range of values; and displaying to the user the identified items that satisfy the desired range of values and the corresponding values of the set of attributes associated with the identified items, wherein values of selected attributes are displayed to the user and values of deselected attributes are not displayed to the user.

8. The method of claim 7, wherein the identified items that satisfy the desired range of values are displayed in a table.

9. The method of claim 8, wherein values of attributes are displayed in columns in the table and each row of the table represents an identified item.

10. The method of claim 9, wherein an attribute that is deselected by the user causes the corresponding column of values associated with that attribute to not be displayed.

11. The method of claim 7, wherein the unique or rare items in the category are gemstones.

12. The method of claim 11, wherein the set of attributes are selected from the group comprising color, cut, clarity, size, and price.

13. The method of claim 7, further comprising:

displaying a plurality of controls having user-adjustable ranges for values that are associated with some of the displayed attributes;

receiving a user input on one of the plurality of controls, the user input specifying a modified range of values for the associated attribute, and;

displaying to the user the identified items that satisfy the modified range of values and the corresponding values of the set of attributes associated with the identified items.

14. The method of claim 13, wherein the plurality of controls are sliders.

15. A computer-readable storage medium storing instructions that, when executed by a computer system, cause the computer system to display a user interface that allows a user to search a database of gemstones, the user interface comprising:

an input component to receive from a user a search request for a desired gemstone;

a search component for searching a gemstone database to identify a plurality of gemstones that satisfy the search request of the user, each of the plurality of gemstones being characterized by values of two or more gemstone attributes;

a display component to display the identified plurality of gemstones, wherein the values of at least some of the gemstone attributes are displayed for each identified gemstone; and an attribute control component that displays a list of additional gemstone attributes for display and allows the user to select one or more gemstone attributes from the list, wherein upon receipt of the selection of one or more gemstone attributes from the list of additional gemstone attributes, the attribute control component causes the display component to display the values of the selected one or more gemstone attributes for each of the identified plurality of gemstones.

16. The computer-readable storage medium of claim 15, wherein the identified plurality of gemstones are displayed by the display component in a table.

17. The computer-readable storage medium of claim 16, wherein values of gemstone attributes are displayed in columns in the table and each row in the table represents a gemstone.

18. The computer-readable storage medium of claim 15, wherein the gemstone attributes are selected from the group comprising color, cut, clarity, size, and price.

19. The computer-readable storage medium of claim 15, wherein the display component further displays additional details about a gemstone when a user selects the gemstone from the identified plurality of gemstones.

20. The computer-readable storage medium of claim 15, wherein the display component further:

displays a plurality of controls having user-adjustable ranges for values that are associated with some of the gemstone attributes of the identified plurality of gemstones;

receives a user input on one of the plurality of controls, the user input specifying a modified range of values for the associated attribute, and;

causes the search component to search the gemstone database to identify a plurality of gemstones that satisfy the modified range of values received from the user.

21. The computer-readable storage medium of claim 20, wherein the display component displays the identified plurality of gemstones that satisfy the modified range of values.

22. The computer-readable storage medium of claim 21, wherein the plurality of controls are sliders.

23. A method of searching a database of gemstones and displaying information about a plurality of gemstones for purchase by a user, the method comprising:

receiving a search request for a desired gemstone from a user;

searching a gemstone database to identify a plurality of gemstones that satisfy the search request of the user, each of the plurality of gemstones being characterized by values of two or more gemstone attributes;

displaying the identified plurality of gemstones, wherein the values of at least some of the gemstone attributes are displayed for each identified gemstone;

displaying a list of additional gemstone attributes for display; and allowing the user to select one or more gemstone attributes from the displayed list of additional gemstone attributes, and, upon receipt of the selection of one or more gemstone attributes from the list of additional gemstone attributes, displaying values of the selected one or more gemstone attributes for each of the identified plurality of gemstones.

24. The method of claim 23, wherein the identified plurality of gemstones are displayed in a table.

25. The method of claim 24, wherein values of gemstone attributes are displayed in columns in the table and each row in the table represents a gemstone.

26. The method of claim 23, wherein the gemstone attributes are selected from the group comprising color, cut, clarity, size, and price.

27. The method of claim 23, further comprising displaying additional details about a gemstone when a user selects the gemstone from the identified plurality of gemstones.

28. The method of claim 23, further comprising:

displaying a plurality of controls having user-adjustable ranges for values that are associated with some of the gemstone attributes of the identified plurality of gemstones;

receiving a user input on one of the plurality of controls, the user input specifying a modified range of values for the associated attribute;

searching the gemstone database to identify a plurality of gemstones that satisfy the modified range of values received from the user; and displaying the identified plurality of gemstones that satisfy the modified range of values.

29. The method of claim 28, wherein the plurality of controls are sliders.

* * * * *